(No Model.)
J. H. WORSELL.
BED PAN.
No. 466,068. Patented Dec. 29, 1891.
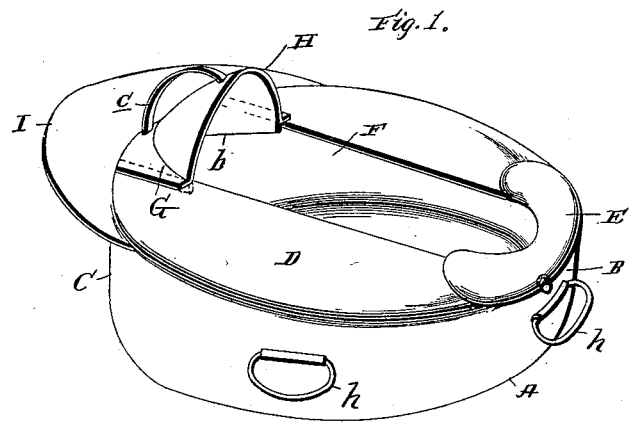
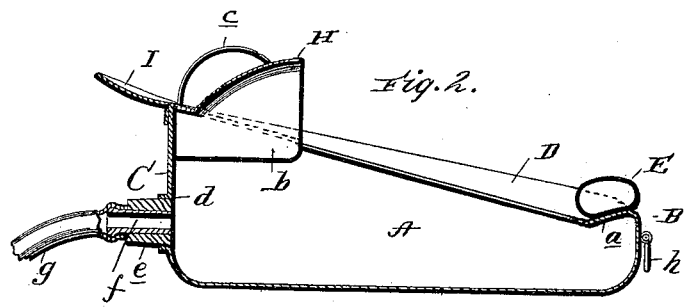
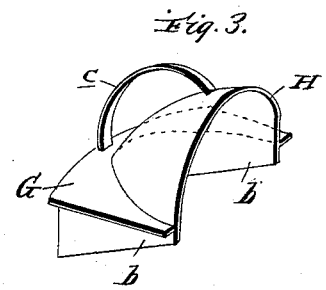
Witnesses:
C. H. Raeder
Thomas E. Turpin
Inventor
John H. Worsell
by James J. Sheehy
Attorney
THE NORRIS PETERS CO., PHOTO-LITHO., WASHINGTON, D. C.

UNITED STATES PATENT OFFICE.

JOHN HENRY WORSELL, OF CLINTON, CANADA.

BED-PAN.

SPECIFICATION forming part of Letters Patent No. 466,068, dated December 29, 1891.

Application filed July 24, 1891. Serial No. 400,569. (No model.) Patented in Canada August 12, 1890, No. 34,852.

*To all whom it may concern:*

Be it known that I, JOHN HENRY WORSELL, a citizen of Canada, residing at Clinton, in the Province of Ontario, Canada, have invented certain new and useful Improvements in Bed Pans, (for which I have received Letters Patent in Canada, No. 34,852, dated August 12, 1890;) and I do declare the following to be a full, clear, and exact description of the invention, such as will enable others skilled in the art to which it appertains to make and use the same.

My invention has relation to improvements in bed-pans, seat-pans, and its novelty will be fully understood from the following description and claims when taken in conjunction with the accompanying drawings, in which—

Figure 1 is a perspective view of my improved bed-pan. Fig. 2 is a diametrical section of the same, and Fig. 3 is a perspective view of the shield removed.

Referring by letter to said drawings, A indicates my improved bed-pan, which is preferably of the ordinary circular or oval form, and is provided with rounded corners, as illustrated, whereby, as is obvious, it may be more readily cleansed.

As better illustrated in Fig. 2 of the drawings, the rear wall B of the pan is of less height than the front wall C, whereby the top wall D is pitched toward the rear wall, and is provided adjacent to said rear wall with an upwardly and rearwardly inclined portion *a*, designed to afford a seat for an arc-shaped air-cushion E, which wall *a* renders the pan more comfortable in use and serves to prevent the contents of the pan from spilling out over the rear wall into the bed, the cushion E being only employed to afford greater comfort to the patient.

The top wall D of the cover, as better illustrated in Fig. 1 of the drawings, is provided with a diametrical slot or opening F, which is preferably of about the proportional width illustrated and extends from the front wall C to the upwardly-inclined portion *a* of the top wall D.

G indicates the shield of my improved pan, which extends over the edges of the opening F and is provided with depending flanges *b*, which serve to hold the shield in position over the opening and guide the same when it is adjusted to different positions over said opening.

Rising from the posterior edge of the shield G is the curved wall H, which serves in practice to deflect the urinal and fecal discharge of the patient into the pan and prevent it from splashing over into the bed. By the provision of the adjustable shield G it will be readily perceived that the wall H may be adjusted to and from the inclined portion *a* of the top wall, which is an important advantage.

Connected at one end to the shield G and at its other end to the wall H thereof is a handle *c*, by which said shield may be readily removed when it is desired to pour the contents of the pan therefrom or to afford more room when it is desired to employ the pan as a support during the operation of introducing an instrument into the rectum or vagina.

Formed upon or connected to the upper edge of the forward wall C of the pan is a lip I, which is slightly dished, as illustrated, and serves to facilitate the pouring of the contents of the pan therefrom.

As illustrated in Fig. 2 of the drawings, I form a discharge-opening *d* in the forward wall C adjacent the bottom of the pan, which opening is plugged by a cork stopper or the like when the pan is employed as an ordinary bed-pan.

When I desire to convert the pan into a douche, I remove the cork stopper before mentioned from the opening *d* and introduce therein a cork or stopper *e*, having a bore to receive a short tube *f*, to the outer end of which a drain-tube *g*, of rubber or the like, is connected, which serves in practice to continuously drain the contents of the pan, as is highly desirable during the operation of irrigating the vagina or uterus of the patient, as it permits of a continuous and thorough operation.

In operation I design employing handles *h* upon the opposite side and rear walls of the pan, whereby the same may be readily removed from place to place; but I do not desire to be confined to the use of such handles, as they are not essential.

Although I have specifically described the form and construction of the pan, together with its component parts, I do not desire to confine myself to such specific form and construction, as such modifications may be made as fairly fall within the scope of my invention.

Having described my invention, what I claim, and desire to secure by Letters Patent, is—

1. The combination, with the bed-pan comprising the flat bottom, the curved side walls, and the top downwardly inclined from the front side wall toward the rear side wall and having a diametrical opening, of a shield having depending flanges to take into the opening of the top, so that the shield may slide therein, said shield also having a curved wall rising from the posterior thereof, and a handle connecting the forward portion of the body with said curved wall, substantially as specified.

2. As a new article of manufacture, a bed-pan comprising the flat bottom, the curved side walls, the top downwardly inclined from the front side wall toward the rear side wall, the upwardly-inclined wall $a$, connecting the rear end of the top wall and the rear side wall, the diametrical slot or opening in the top extending from the front side wall to the wall $a$, an approximately arc-shaped air-cushion seated in the angle at the juncture of the top and the wall $a$, the flat shield adjustably mounted upon the top wall and having depending flanges to take into the opening of said top wall, the curved wall rising from the posterior edge of the flat portion, and the handle connected to the flat portion and to the curved wall, all substantially as and for the purpose specified.

In testimony whereof I affix my signature in presence of two witnesses.

JOHN HENRY WORSELL.

Witnesses:
 JOSEPH WHITEHEAD,
 NATHANIEL TILT.